United States Patent [19]

Zentgraf et al.

[11] Patent Number: 4,569,432

[45] Date of Patent: Feb. 11, 1986

[54] ARRANGEMENT FOR FEEDING OF A FINE-PARTICLE MATERIAL TO ELECTROSTATIC FREE-FALL CUTTER

[75] Inventors: Helmut Zentgraf, Burghaun; Günter Fricke; Iring Geisler, both of Bad Hersfeld; Heinrich Balzer, Heringen; Hans Burghardt; Fritz Maikranz, both of Hohenroda, all of Fed. Rep. of Germany

[73] Assignee: Kali und Salz AG, Kassel, Fed. Rep. of Germany

[21] Appl. No.: 517,717

[22] Filed: Jul. 26, 1983

[30] Foreign Application Priority Data

Jul. 26, 1982 [DE] Fed. Rep. of Germany ....... 3227814

[51] Int. Cl.[4] .............................................. B65G 11/20

[52] U.S. Cl. .................................. 193/32; 209/127 C; 209/911; 209/127.4

[58] Field of Search ........... 209/127 R, 127 A, 127 B, 209/127 C, 910, 911; 193/32, 40, 27; 222/564; 366/337, 338

[56] References Cited

U.S. PATENT DOCUMENTS 3,138,296 6/1964 Neidhart ............................ 222/564
4,138,020 2/1979 Steiner ................................ 222/564
4,297,207 10/1981 Singewald et al. ......... 209/127 C X

FOREIGN PATENT DOCUMENTS 0581849 10/1946 United Kingdom ................ 366/337

*Primary Examiner*—Charles Hart
*Attorney, Agent, or Firm*—Michael J. Striker

[57] ABSTRACT

An arrangement for feeding a fine-particle material to be separated to an electrostatic free-fall cutter is formed as a funnel with braking inserts and inclined walls whose edges limit a small elongated rectangular discharge slot, wherein a greater wall is inclined to an opposite vertical wall which has an inclined downwardly directed guiding member, and a wedge-shaped projection with an upper horizontal surface is located at the lower edge of the inclined wall and extends into the discharge slot.

11 Claims, 2 Drawing Figures

ARRANGEMENT FOR FEEDING OF A FINE-PARTICLE MATERIAL TO ELECTROSTATIC FREE-FALL CUTTER

BACKGROUND OF THE INVENTION

The present invention relates to an arrangement for feeding fine-particle material to be separated to an electrostatic free-fall cutter.

Methods of dry separation of mixtures of fine-particle materials or minerals in a high-voltage field of an electrostatic free-fall cutter are known in the art, for example as disclosed in "Chemie-Ingenieur-Technik" 53 (1981) 9/6. These methods have high technical importance and are used in industrial production, for example for separating comminuted triboelectrically charged crude potassium salt. For obtaining good separation of valuable substance from the remaining components of the material to be separated in the electrostatic high-voltage field of a free-full cutter, it is known to break the fine-particle material which flows in free fall from the inlet to the electrostatic high-voltage field of the free-fall cutter. A supply funnel is used for this purpose, as disclosed for example in the German Pat. No. 1,174,273. The funnel has an upper inclined part which opens into a lower part limited by vertical walls, and braking inserts for example as open semi-pipes are provided in the lower part. The inserts must separate the stream of material and a great width of the material stream is obtained, so that it must flow as thin material fog into the separating device. The industrial utilization of this known supply funnel has shown, however, that is provides for a good braking action of the material to be separated, but the material to be separated is subdivided into individual streams and each stream has a different quantity of the material to be separated, so that essential variations in the flow of the material to be treated take place.

SUMMARY OF THE INVENTION

Accordingly, it is an object of the present invention to provide an arrangement for feeding of fine-particle materials to an electrostatic free-fall cutter, which permits to produce a braked stream of the material which leaves the arrangement as a uniform fog in a good bundle, but without formation of separate streams or rays.

In keeping with these objects and with others which will become apparent hereinafter, one feature of the present invention resides, briefly stated, in an arrangement for feeding a fine-particle material to be separated in an electrostatic free-fall cutter which is formd as a supply funnel wherein an inclined wall which forms at its lower edge a small slot is inclined toward an opposite vertical wall, a guiding member is provided, and a braking insert is formed at the lower edge of the inclined wall and has an upper horizontal surface, wherein the lower edge of the vertical wall extends downwardly below the lower edge of the inclined wall.

The novel features which are considered characteristic for the invention are set forth in particular in the appended claims. The invention itself, however, both as to its construction and method of operation, together with additional objects and advantages thereof, will be best understood from the following description of specific embodiments when read in connection with the accompanying drawing.

DESCRIPTION OF THE PREFERRED EMBODIMENTS

Figure 1:
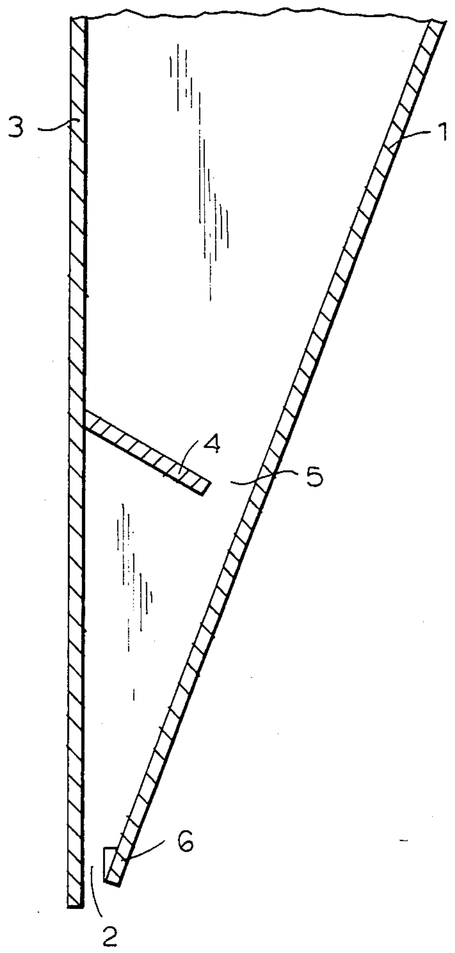
FIG. 1 is a view schematically showing an arrangement for feeding a fine-particle material to be separated in an electrostatic free-fall cutter, in accordance with one embodiment of the present invention.

An arrangement in accordance with one embodiment of the present invention has a big wall identified with reference numeral 1 and having a lower edge which limits a small elongated and rectangular discharge slot 2 in its length. The wall 1 is inclined to an opposite vertical wall 3 so that the walls 1 and 3 together form an acute angle.

The vertical wall 3 has a guiding member 4 which is inclined downwardly. The guiding member 4 is advantageously formed as a guiding surface provided on an inner surface of the vertical wall 3 at a height of a central axis which is parallel to the discharge slot 2. The guiding surface forms an acute angle with the lower part of the wall 3 and has a free edge which forms with the inner surface of the wall 1 a slot 5.

The wall 1 has at its lower edge a projection 6 which is wedge-shaped and extends into the small slot 2. The projection 6 is provided with an upper horizontal surface. Moreover, the lower edge of the vertical wall 3 extends downwardly beyond the lower edge of the inclined wall 1.

Figure 2:
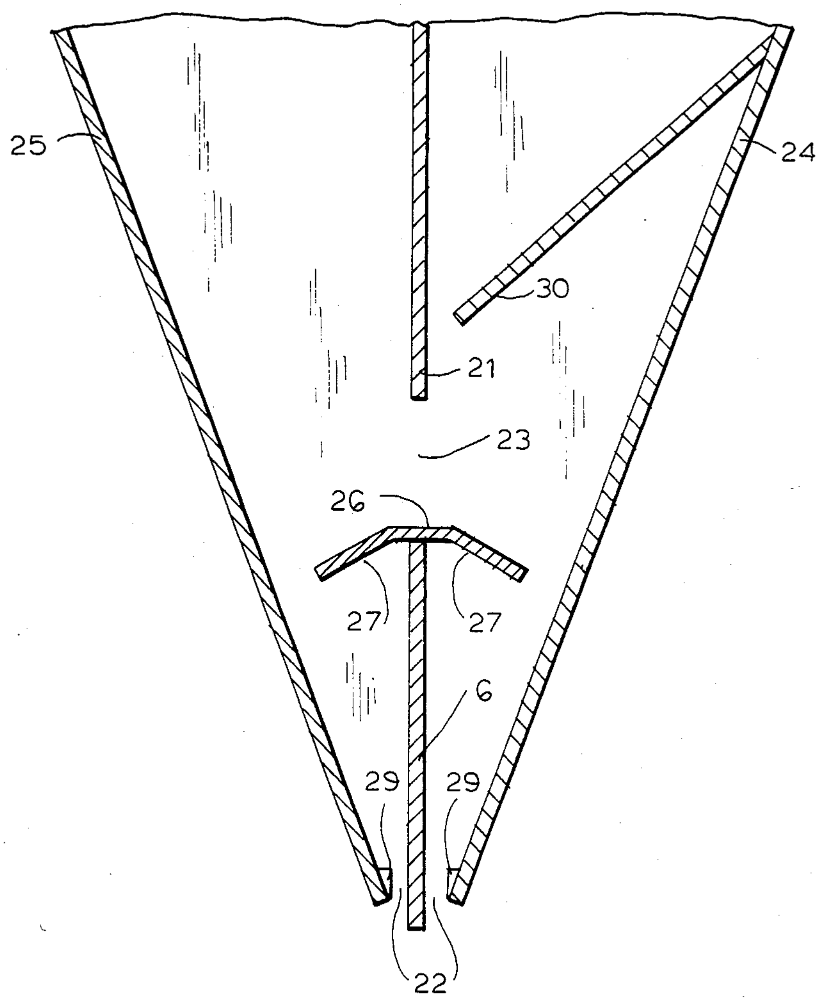
FIG. 2 is a view substantially corresponding to the view of FIG. 1, but showing the arrangement in accordance with another embodiment of the invention.

FIG. 2 shows an arrangement in accordance with another embodiment of the present invention. This arrangement has a vertical wall which is identified with reference numeral 1 and two inclined walls identified with reference numerals 24 and 25 and arranged at opposite sides of the vertical wall 21. One of the inclined walls, namely the inclined wall 24, has a guiding surface 30 which is inclined downwardly. The guiding surface 30 extends from the inclined wall 24 toward the vertical wall 21 and a free end of the guiding surface 30 forms a slot with the vertical wall 21. The vertical wall 21 has a wider slot 23 which is located under the slot formed by the free end of the guiding surface 30 and the vertical wall 21. Each inclined wall 24 and 25 forms with the vertical wall 21 an acute angle.

The wide slot 23 has a lower limiting edge and is provided at its edge with a horizontal guiding surface 26. The horizontal surface 26 has two free longitudinal edges such provided with a downwardly inclined guiding surface 27. Small slots 22 are provided between the lower edges of the inclined walls 24 and 25 and the vertical wall 21. The inclined walls 24 and 25 have wedge-shaped projections 28 and 29, respectively, extending into the respective slots 22 and having upper vertical surfaces. The lower edge of the vertical wall 21 extends downwardly beyond the lower edge of the inclined walls 24 and 25.

In the arrangement of both embodiments, the walls 1 and 3 or 24 and 25 are laterally connected by respective wedge-shaped walls so as to form an elongated rectangular funnel.

A material to be separated in the arrangement of FIG. 1 falls into a loose stream continuously, first onto the inclined guiding surface 4 which deflects it in direction toward the inner surface of the inclined wall 1. The material to be separated flows along the inner surface of the inclined wall 1 in direction toward the discharge slot 2. The horizontal surface of the wedge-shaped projection 6 brakes the material in its flow and deflects the same so that it meets the vertical wall 3 at a right angle. Thereby a movable layer of the material is formed somewhat above the discharge slot 6 and applies a substantial braking action. A stream of material which has a constant quantity over its entire width falls from this layer of the material as a fog out of the discharge slot 6 into an electrostatic free-fall cutter located under the inventive arrangement. The electrostatic free-fall cutter is not shown in the drawing.

In the arrangement in accordance with the embodiment of FIG. 2, the continuously supplied material to be separated falls first onto the guiding surface 30 and flows over the latter toward the slot formed between the free edge of the guiding surface 30 and the vertical wall 21. When the material travels in a uniform stream onto this horizontal guiding surface 26 and is uniformly distributed from the latter by the guiding surface 27 toward the inner surfaces of the walls 24 and 25. Then the material flows along the inner surfaces of the walls 24 and 25 in direction toward the discharge slots 22. Here again, the wedge-shaped projections 29 located above the discharge slot 22 form a movable layer of the material, and a uniform fog of the material flows from the discharge slot 22 to a subsequently arranged electrostatic free-fall cutter. In this embodiment, two fogs of the material provide for a greater freedom of movement of the particles of the material to be separated in an electrostatic field of the free-fall cutter which is favorable for deflecting of the particles of the material in the electric field in desirable manner.

The inventive arrangement provides not only a desired braking of the uniformly flowing stream of the fine-particle material, but also the formation of a uniform and strand-free fog of the material exiting the arrangement. Thereby the subsequent electrostatic separation is produced in advantageous manner so that the residue separated from the material as well as the final product has a lower content of valuable substance than in the known feeding arrangements. Particularly in the embodiment of FIG. 2, the horizontal movability of the particles in the discharged fog of the material is favorably provided so that the particles in correspondence with their state of charge during free fall through the electrical field of the electrostatic free-fall cutter is deflected more easily than from a narrowly bundled stream.

The advantages of the inventive arrangement are illustrated in the following example, in which the material to be separated in a crude potassium salt comminuted to a grain size of below 2 mm.

The crude potassium salt is conditioned with 75 g/t salicylic acid and 20 g/t monochloroacetate and is triboelectrically charged with a relative air moisture of 10%. The thus treated crude potassium salt is then supplied in a free fall through the inventive arrangement or a known feeding arrangement to an electrostatic free-fall cutter in which an electric field of 3.5 kV/cm is maintained.

The comparison of the results produced in these examples shows that, with he same residual quantity, a residue obtained in the inventive arrangement has a considerably lower content of the valuable substance $K_2O$ than a residue produced in the conventional feeding arrangement.

EXAMPLE 1

(in accordance with the invention)

The charged crude potassium salt falls free in a quantity of 30 t/h m (length of the discharge slot) in the inventive arrangement according to the embodiment of FIG. 2 with a total width of both discharge slots of 4 cm, and flows through these discharge slots in free fall to the electrostatic field of the free-fall cutter. At the foot of this cutter, in the vicinity of the negative electrode, 25% by weight of the quantity of the fed material is obtained as residue with a $K_2O$ content of 1.2 weight-%.

EXAMPLE 2

(comparison)

A known feeding arrangement is used for the supply in accordance with Example 1. At the foot of the cutter 25 weight-% of residue is obtained with a content of $K_2O$ of 1.41 weight-%.

EXAMPLE 3

(in accordance with the invention)

The charged crude potassium salt falls free in a quantity of 20 t/h m (length of the discharge slot) in the inventive arrangement in accordance with FIG. 1 and flows through the discharge slot in free fall to the electrostatic field of the free-fall cutter. At the foot of the cutter, in the vicinity of the negative electrode, 30 weight-% of the quantity of the fed material is obtained as residue with a content of $K_2O$ of 1.55 weight-%.

EXAMPLE 4

(in accordance with the invention)

The inventive arrangement in accordance with the embodiment of FIG. 2 is used for the conditions of Example 3. At the foot of the cutter on the negative electrode 30 weight-% of the supplied material is obtained as residue with a $K_2O$ content of 1.45 weight-%.

EXAMPLE 5

(comparison)

A known feeding arrangement is used for the condition of Example 3. At the foot of the cutter 30 weight-% of the introduced material is obtained as residue with a $K_2O$ content of 1.69 weight-%.

It will be understood that each of the elements described above, or two or more together, may also find a useful application in other types of constructions differing from the types described above.

While the invention has been illustrated and described as embodied in an arrangement for feeding of fine-particle material to an electrostatic free-fail cutter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for feeding a fine-particle material to be separated in an electrostatic free-fall cutter, comprising a substantially vertical wall having a lower edge;

a downwardly inclined guiding member;

an inclined wall which is inclined toward said vertical wall and has a lower edge which forms a small discharge slot, said lower edge of said vertical wall extending downwardly beyond said lower edge of said inclined wall; and a braking insert extending from said inclined wall into said small discharge slot and having a horizontal upper surface, so that a stream of a material which passes through the arrangement is braked by said horizontal upper surface of said braking insert and is thereby deflected to meet said vertical wall at a right angle so as to form above said small discharge slot a movable layer of the material which applies a braking action and from which the material is discharged through said small discharge slot as a fog.

2. An arrangement as defined in claim 1, wherein said braking insert is formed as a wedge-shaped member provided on said lower edge of said inclined wall.

3. An arrangement as defined in clam 1, wherein said small slot is formed as an elongated rectangular slot.

4. An arrangement as defined in claim 1, wherein said vertical and inclined walls are composed of an electrically insulating material.

5. An arrangement as defined in claim 1, wherein said vertical wall has an inner surface and a central axis extending parallel to said small slot, said guiding member having a guiding surface which extends from said inner surface of said vertical wall at a height of said central axis and forms an acute angle with said inner surface.

6. An arrangement as defined in claim 5, wherein said inclined wall has an inner surface, said guiding surface having a free edge which forms with said inner surface of said inclined wall a further slot.

7. An arrangement as defined in claim 1, wherein said downwardly inclined guiding member is provided on and extends downwardly from said vertical wall.

8. An arrangement for feeding a fine-particle material to be separated in an electrostatic free-fall cutter, comprising a substantially vertical wall having a lower edge;

a downwardly inclined guiding member;

a first inclined wall which is inclined toward said vertical wall and has a lower edge which forms a first small discharge slot, said first inclined wall being located at one side of said vertical wall;

a second inclined wall which is inclined toward said vertical wall at an opposite side of said vertical wall and has a lower edge which forms a second small discharge slot;

a first braking insert having a horizontal upper surface and extending from said first inclined wall into said small slot, said lower edge of said first vertical wall extending downwardly beyond said lower edge of said first inclined wall; and a second braking insert having a horizontal upper surface and extending from said second inclined wall into said second small slot, said lower edge of said vertical wall also extending downwardly beyond said lower edge of said second inclined wall.

9. An arrangement as defined in claim 8, wherein one of said inclined wall has an inner surface and an upper edge, said guiding member having a downwardly inclined guiding surface which extends from said inner surface of said one inclined wall in the region of said upper edge.

10. An arrangement as defined in claim 9, wherein said vertical wall has a surface, said guiding surface having a free edge which forms together with said surface of said vertical wall an additional small slot.

11. An arrangement as defined in claim 10, wherein said vertical wall has a wider slot located under said small slot and having a lower limiting edge; and further comprising a further guiding member provided with a further horizontal guiding surface which extends on said lower edge of said additional slot and has two free edges each provided with a further downwardly inclined guiding surface.

* * * * *